(12) United States Patent
Seimoto et al.

(10) Patent No.: US 9,579,930 B2
(45) Date of Patent: Feb. 28, 2017

(54) PRINTING DEVICE AND TIRE MARKING APPARATUS

(71) Applicant: MITSUBISHI HEAVY INDUSTRIES MACHINERY TECHNOLOGY CORPORATION, Hiroshima-shi, Hiroshima (JP)

(72) Inventors: Yasutaka Seimoto, Hiroshima (JP); Tatsuya Ueda, Hiroshima (JP); Hiroaki Yoneda, Hiroshima (JP); Kunio Matsunaga, Hiroshima (JP)

(73) Assignee: MITSUBISHI HEAVY INDUSTRIES MACHINERY TECHNOLOGY CORPORATION, Hiroshima-shi, Hiroshima (JP)

( * ) Notice: Subject to any disclaimer, the term of this patent is extended or adjusted under 35 U.S.C. 154(b) by 0 days.

(21) Appl. No.: 14/910,901

(22) PCT Filed: Feb. 6, 2015

(86) PCT No.: PCT/JP2015/053358
§ 371 (c)(1),
(2) Date: Feb. 8, 2016

(87) PCT Pub. No.: WO2016/125298
PCT Pub. Date: Aug. 11, 2016

(65) Prior Publication Data
US 2016/0355061 A1 Dec. 8, 2016

(51) Int. Cl.
*B41J 2/325* (2006.01)
*B60C 13/00* (2006.01)
*B41J 3/407* (2006.01)

(52) U.S. Cl.
CPC ............ *B60C 13/001* (2013.04); *B41J 2/325* (2013.01); *B41J 3/4073* (2013.01)

(58) Field of Classification Search
CPC . B41J 2/325; B41J 3/4075; B41J 15/04; B41J 11/04; B41J 23/00; B41J 11/007
See application file for complete search history.

(56) References Cited

U.S. PATENT DOCUMENTS

| | | | |
|---|---|---|---|
| 6,879,333 B2* | 4/2005 | Furuyama | B41J 2/3357 347/208 |
| 8,622,538 B2* | 1/2014 | Miyakoshi | B41J 2/165 347/101 |
| 9,028,034 B2* | 5/2015 | Horaguchi | B41J 11/007 347/104 |

FOREIGN PATENT DOCUMENTS

| | | |
|---|---|---|
| JP | S59-232880 A | 12/1984 |
| JP | S63-286375 A | 11/1988 |

(Continued)

OTHER PUBLICATIONS

PCT/ISA/210, "International Search Report for International Application No. PCT/JP2015/053358," Apr. 14, 2015.

(Continued)

*Primary Examiner* — Lamson Nguyen
(74) *Attorney, Agent, or Firm* — Manabu Kanesaka; Benjamin Hauptman; Kenneth Berner

(57) ABSTRACT

This printing device includes a first supply roller and a second supply roller that supply the pair of ink ribbons; a first winding roller and a second winding roller that are pulled out from the first supply roller and the second supply roller and wind the pair of ink ribbons passing through a printing position; and a roller driving unit that rotates the first winding roller and the second winding roller. The roller driving unit includes one rotational driving device in which a rotating shaft is rotatable in a normal direction and a reverse direction, a first transmission mechanism that transmits only the rotation of the rotating shaft in the normal direction to the first winding roller, and a second transmis- (Continued)

sion mechanism that transmits only the rotation of the rotating shaft in the reverse direction to the second winding roller.

3 Claims, 11 Drawing Sheets

(56) References Cited

FOREIGN PATENT DOCUMENTS

| | | |
|---|---|---|
| JP | H06-046953 U | 6/1994 |
| JP | 2000-329658 A | 11/2000 |
| JP | 2001-198860 A | 7/2001 |
| JP | 2002-122500 A | 4/2002 |
| JP | 2012-181079 A | 9/2012 |
| WO | 2011/097621 A1 | 8/2011 |

OTHER PUBLICATIONS

PCT/ISA/237, "Written Opinion of the International Searching Authority for International Application No. PCT/JP2015/053358," Apr. 14, 2015.

* cited by examiner

PRINTING DEVICE AND TIRE MARKING APPARATUS

RELATED APPLICATIONS

The present application is National Phase of International Application No. PCT/JP2015/053358 filed Feb. 6, 2015, the disclosure of which is hereby incorporated by reference herein in its entirety.

TECHNICAL FIELD

The present invention relates to a printing device for performing marking in a tire or the like, and a tire marking apparatus including the printing device.

BACKGROUND ART

It is required that printing devices that perform marking in tires are included in equipment that tests and inspects completed tires, such as tire uniformity machines that measure the non-uniformity of tires or balancing machines that measure the unbalance of tires.

In the printing devices, it is required that marks, such as circular shapes or triangular shapes, are dotted (marking is performed) at circumferential positions (phases) of a tire, which are determined from measurement results and criteria for determination, on a sidewall of the tire.

Various shapes and colors of the marks have been required in recent years, and a plurality of marks may be required for a tire.

As the types of positions where marking is performed in a tire, there are a type in which marking is required on determined phases of a tire, and a type in which marking is allowed to be performed on arbitrary phases on a sidewall.

In a case where a plurality of marks are formed in a tire, it is known that a plurality of marks are formed in a sidewall of a tire with positions being shifted from each other in a radial direction of the tire, and or a plurality of marks are formed with positions being shifted from each other in a circumferential direction. Increasing the number of marks by combining shifting the positions from each other in the radial direction of the tire and shifting positions from each other in the circumferential direction is also known.

For example, in Patent Document 1, as this type of printing device, a printing device has three marking pins, a supporting base that supports two heat transfer tapes (ink ribbons), an air cylinder that moves the supporting base, and an air cylinder that pushes out a marking pin toward a heat transfer tape that faces the marking pin.

As the air cylinder moves the supporting base, any one of the two heat transfer tapes faces the three marking pins.

One heat transfer tape is delivered from a first delivery reel, and is wound by a first winding reel (first winding roller) that is rotated by a first rotational driving device (roller driving unit). The other heat transfer tape is delivered from a second delivery reel, and is wound by a second winding reel (second winding roller) that is rotated by a second rotational driving device (roller driving unit).

In the printing device configured in this way, as the air cylinder pushes out each marking pin toward a heat transfer tape that faces the marking pin, the marking pin is pressed against the heat transfer tape and printing is performed in a tire.

CITATION LIST

Patent Literature

[Patent Document 1] Japanese Unexamined Patent Application Publication No. 2012-181079

SUMMARY OF INVENTION

Technical Problem

However, in the printing device of Patent Document 1, every heat transfer tape requires a rotational driving device for winding the heat transfer tape. For this reason, as the types of color of heat transfer tapes to be used in a printing device increase, the number of rotational driving devices required to constitute the roller driving unit increases, and the configuration of the roller driving unit becomes complicated. The invention has been made in view of such problems, and an object thereof is to provide a printing device and a tire marking apparatus in which a roller driving unit is simply configured.

Solution to Problem

In order to solve the above problems, the invention suggests the following means.

A printing device of a first aspect of the invention is a printing device capable of performing printing with a pair of ink ribbons. The printing device includes a first supply roller and a second supply roller that supply the pair of ink ribbons; a first winding roller and a second winding roller that are pulled out from the first supply roller and the second supply roller and wind the pair of ink ribbons passing through a printing position; and a roller driving unit that rotates the first winding roller and the second winding roller. The roller driving unit includes one rotational driving device in which a rotating shaft is rotatable in a normal direction and a reverse direction, a first transmission mechanism that transmits only the rotation of the rotating shaft in the normal direction to the first winding roller, and a second transmission mechanism that transmits only the rotation of the rotating shaft in the reverse direction to the second winding roller.

According to this aspect, an ink ribbon is wound by the first winding roller by rotating the rotating shaft of one rotational driving device in the normal direction. Similarly, an ink ribbon is wound by the second winding roller by rotating the rotating shaft of the rotational driving device in the reverse direction. In this way, the number of rotational driving devices required in order to wind the pair of ink ribbons can be one, and the roller driving unit can be simply configured.

Additionally, in the above printing device, the first transmission mechanism may include a first driven wheel coaxially attached to the first winding roller, the second transmission mechanism may include a second driven wheel coaxially attached to the second winding roller and rotatable on the same plane as the first driven wheel, and the roller driving unit may include one annular member connected to the first driven wheel, the second driven wheel, and the rotating shaft of the rotational driving device, respectively.

According to this aspect, since one annular member just has to be used for rotating the first driven wheel and second driven wheel by the rotating shaft of the rotational driving device, the overall configuration of the first transmission mechanism and the second transmission mechanism can be simplified.

Additionally, a tire marking apparatus of a second aspect of the invention includes the printing device according to any one of the above descriptions and performs marking in a tire.

According to this aspect, the tire marking apparatus can also be simply configured by simply configuring the roller driving unit.

Advantageous Effects of Invention

According to the printing device and the tire marking apparatus of the invention, the roller driving unit can be simply configured.

DESCRIPTION OF EMBODIMENTS

Hereinafter, an embodiment of a tire marking apparatus (hereinafter also simply referred to as a "marking apparatus") related to the invention will be described, referring to FIGS. 1 to 13.

Figure 1:
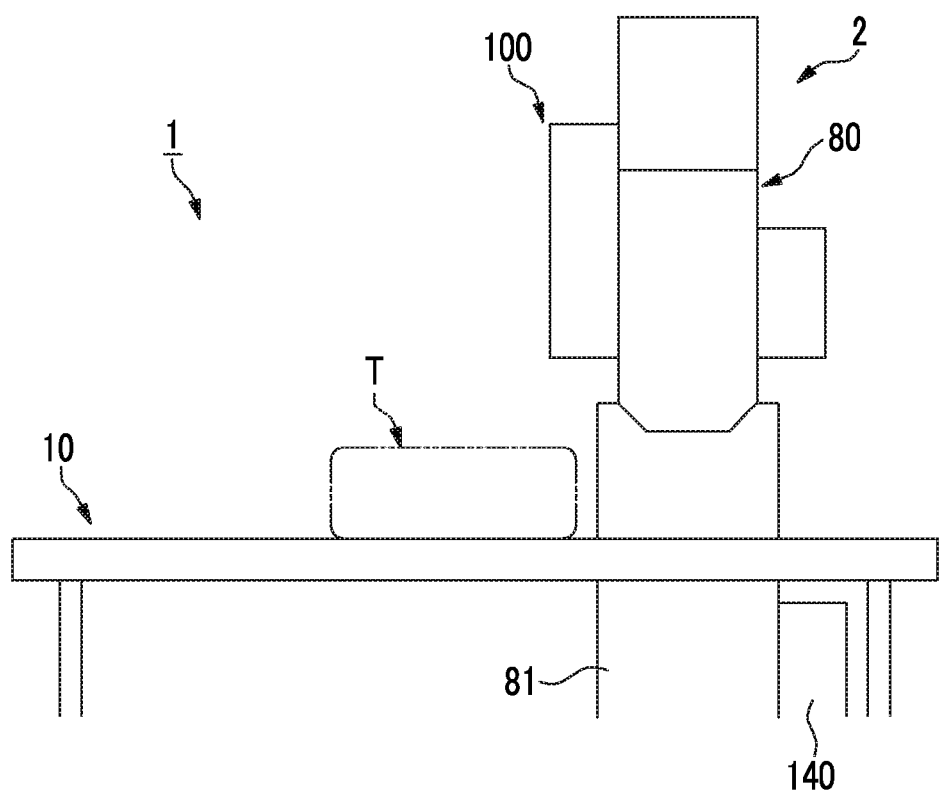
FIG. 1 is a view illustrating the outline of an overall configuration of a tire marking apparatus of an embodiment of the invention.
Figure 2:
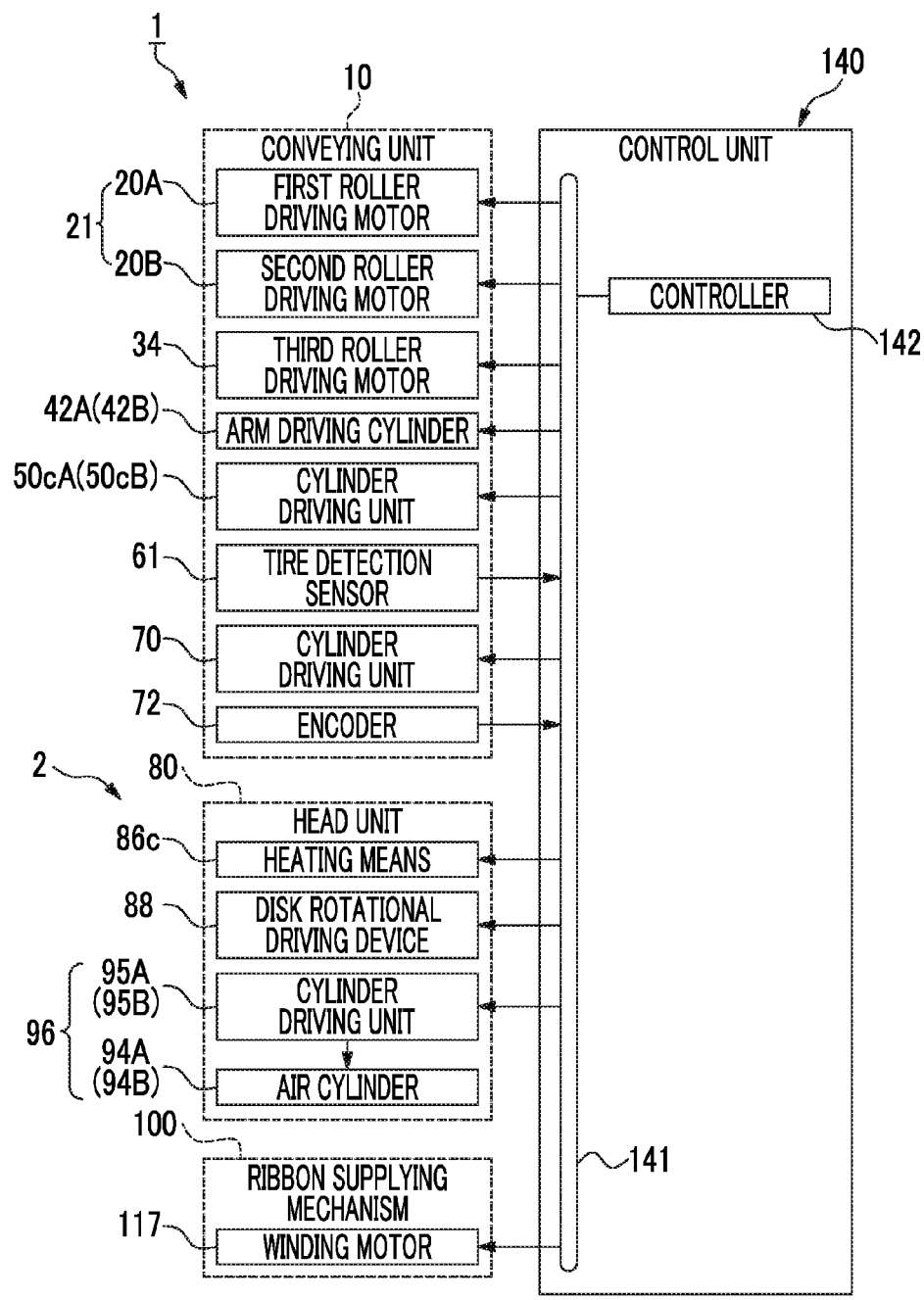
FIG. 2 is a block diagram of the tire marking apparatus.

As illustrated in FIGS. 1 and 2, a marking apparatus 1 of the present embodiment is configured to perform marking (printing) in a tire T, and includes a conveying unit 10 that supports and conveys the tire T from below, a head unit 80 that is arranged above the conveying unit 10, a ribbon supplying mechanism 100 that is attached to the head unit 80, and a control unit 140 that controls the conveying unit 10, the head unit 80, and the ribbon supplying mechanism 100.

In addition, the head unit 80 and the ribbon supplying mechanism 100 constitute a printing device 2 of the invention. The marking apparatus 1 includes the printing device 2.

Figure 3:
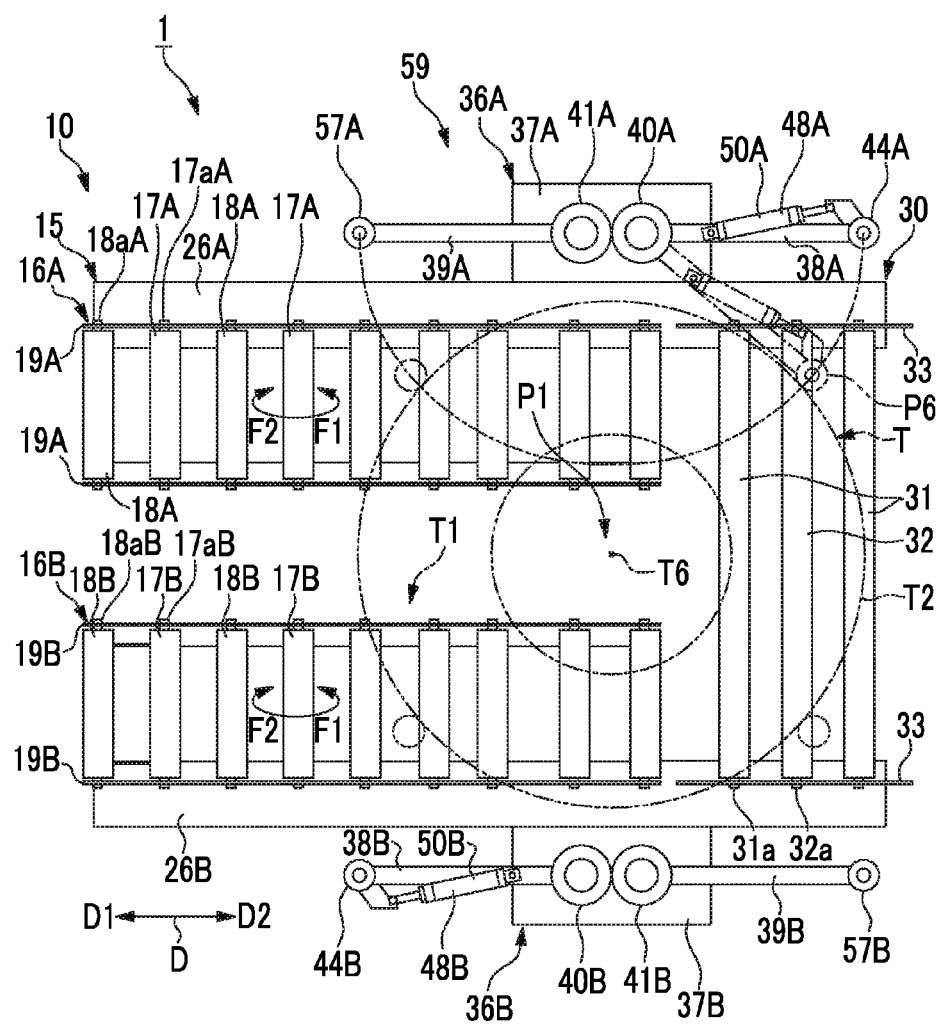
FIG. 3 is a plan view of a conveying lane of the tire marking apparatus.
Figure 4:
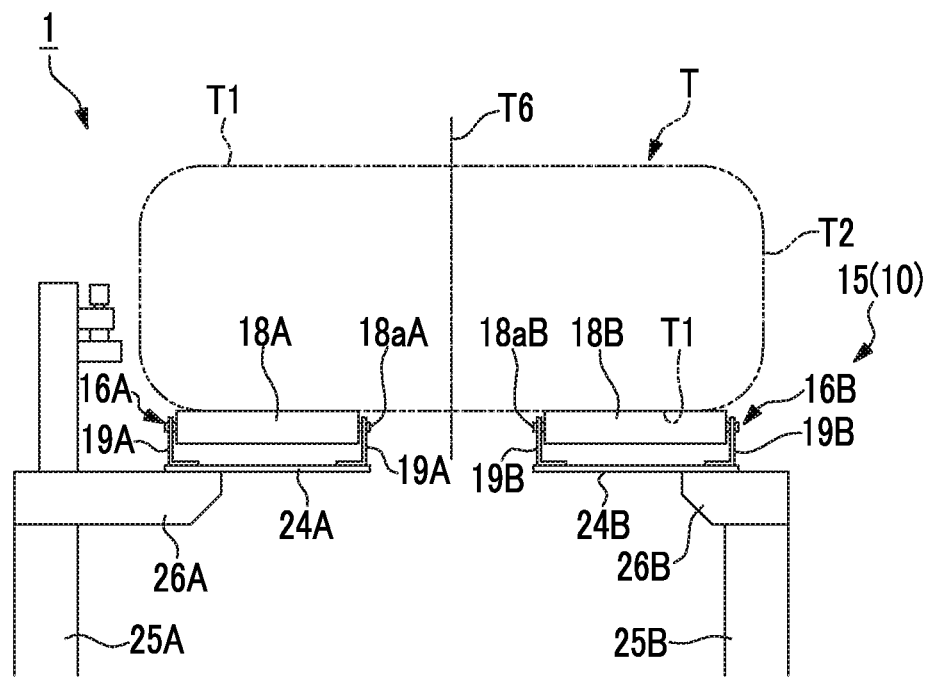
FIG. 4 is a front view of the integrated conveying lane.

As illustrated in FIGS. 3 and 4, the conveying unit 10 has a split conveying lane 15 in which a first conveying lane 16A and a second conveying lane 16B are arranged side by side in a width direction of the conveying unit 10 on an upstream side D1 in the conveying direction D of the conveying unit 10, and an integrated conveying lane 30 that is arranged on a downstream side D2 in the conveying unit 10. Since the configurations of the first conveying lane 16A and the second conveying lane 16B are the same in the present embodiment, the configuration of the first conveying lane 16A will be illustrated by adding the English capital letter "A" to figures or English lower letters, and the configuration corresponding to the second conveying lane 16B will be illustrated by adding the English capital letter "B" to figures or English lower case letters. Accordingly, overlapping description will be omitted. Positioning units 36A and 36B, printing pins 90A to 90H, and the like to be described below will be described similarly.

For example, the configurations of a first driving roller 17A and a second driving roller 17B (to be described below) of the first conveying lane 16A are the same.

In the first conveying lane 16A, each first driving roller 17A and each first driven roller 18A are rotatably supported by support members 19A at both ends in the width direction around their respective axes 17aA and 18aA. The height of an upper surface of the first driving roller 17A and the height of an upper surface of the first driven roller 18A substantially coincide with each other, or the upper surface of the first driving roller 17A is arranged to be slightly higher. The first driving roller 17A and the first driven roller 18A are alternately arranged along the conveying direction D. The first driving roller 17A and the first driven roller 18A are arranged on the same plane where the axes 17aA and 18aA are parallel to the horizontal plane.

A belt that is not illustrated is connected to the respective first driving rollers 17A. A rotating shaft of a first roller driving motor 20A illustrated in FIG. 2 is connected to this belt. The rotating shaft of the first roller driving motor 20A can be driven so as to be switched to a normal direction (first direction) and a reverse direction (second direction). The first roller driving motor 20A and a second roller driving motor 20B constitute a conveyance driving unit 21.

As illustrated in FIGS. 3 and 4, the tire T is arranged on the respective first driving rollers 17A, the respective first driven rollers 18A, the respective second driving rollers 17B, and the respective second driven rollers 18B. In this case, the tire T is arranged so that a side surface of at least the first driving roller 17A abuts against one side of a sidewall (printing surface) T1 of the tire T with respect to an axis T6 of the tire T and a side surface of the first driven roller 18A auxiliary abuts against the one side. The tire T is arranged so that a side surface of at least the second driving roller 17B abuts against the other side of the sidewall T1 with respect to the axis T6 and a side surface of the second driven roller 18B auxiliary abuts against the other side. The rollers 17A and 18A and the rollers 17B and 18B abut against the one sidewall T1 of the tire T, respectively.

By rotating the rotating shaft of the first roller driving motor 20A in the normal direction, as illustrated in FIG. 3, each first driving roller 17A rotates in a normal direction F1 around its axis 17aA. By rotating the rotating shaft of the second roller driving motor 20B in the normal direction, each second driving roller 17B rotates in the normal direction F1 around its axis 17aB. In this case, the tire T arranged on the respective driving rollers 17A and 17B are conveyed from the upstream side D1 toward the downstream side D2. Each first driven roller 18A and each second driven roller 18B that support the tire T to be conveyed performs the corotation of rotating according to movement of the tire T.

In this way, the driving rollers 17A and 17B are rollers that rotationally drive the tire T, and the driven rollers 18A and 18B are rollers that are driven according to the rotating tire T.

On the other hand, if the rotating shafts of the roller driving motors 20A and 20B are rotated in the reverse direction, the first driving roller 17A rotates in a reverse direction F2 around its axis 17aA, and the second driving roller 17B rotates in the reverse direction F2 around its axis 17aB. In this case, the tire T arranged on the respective driving rollers 17A and 17B are conveyed from the downstream side D2 toward the upstream side D1.

In the first conveying lane 16A, as illustrated in FIGS. 3 and 4, the pair of support members 19A are connected together by a coupling member 24A.

The coupling member 24A is attached to a support member 26A provided at a leg 25A extending in an upward-downward direction. As a lower end of the leg 25A is arranged on a floor surface (not illustrated), the first conveying lane 16A is supported at a position separated upward from the floor surface.

The integrated conveying lane 30 is configured similar to the integrated conveying lanes 16A and 16B. That is, as illustrated in FIG. 3, in the integrated conveying lane 30, each third driving roller 31 and each third driven roller 32 are supported by the support members 33 at both ends in the width direction so as to be rotatable around their respective axes 31a and 32a. The support members 33 are attached to the aforementioned support members 26A and 26B.

A belt that is not illustrated is connected to the respective third driving rollers 31. A rotating shaft of a third roller driving motor 34 (refer to FIG. 2) is connected to this belt. The rotating shaft of the third roller driving motor 34 can be driven so as to be switched to the normal direction and the reverse direction.

The support member 26A is provided with the first positioning unit 36A.

In the first positioning unit 36A, a pair of holding arms 38A and 39A are supported on a supporting base 37A so as to be rotatable (rockable) about first ends of the holding arms 38A and 39A. The holding arms 38A and 39A can be rotated on a plane parallel to the horizontal plane about on their respective first ends via gears 40A and 41A by an arm driving cylinder 42A (refer to FIG. 2). The holding arm 38A is arranged closer to the downstream side D2 than the holding arm 39A.

Figure 5:
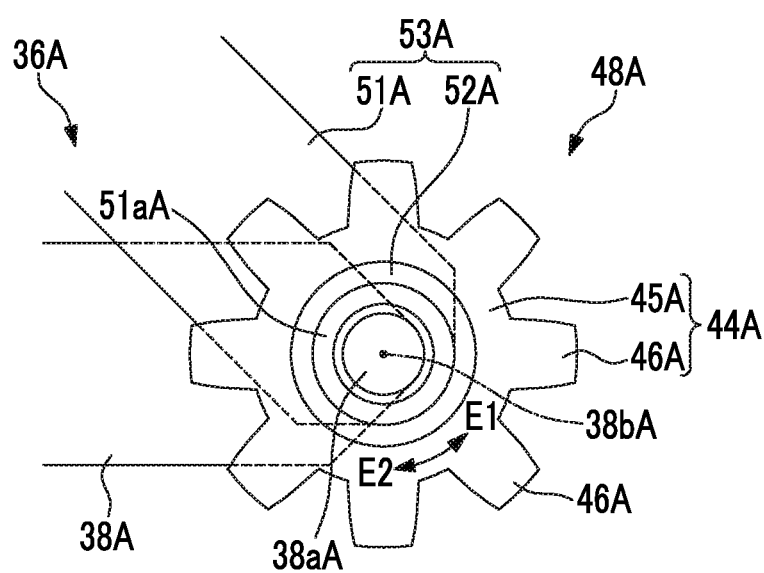
FIG. 5 is a view illustrating the internal structure of a first positioning unit of the integrated conveying lane.

As illustrated in FIG. 5, a second end of the holding arm 38A is provided with a columnar shaft member 38aA. A driving roller 44A illustrated in FIGS. 5 and 6 is rotatably supported by the shaft member 38aA.

The driving roller 44A is supported so as to be rotatable around an axis orthogonal to the horizontal plane.

Figure 6:
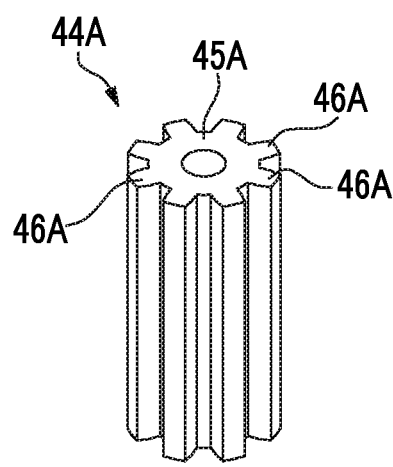
FIG. 6 is a perspective view of a driving roller of the first positioning unit.

As illustrated in FIGS. 5 and 6, the driving roller 44A has a cylindrical roller body 45A, and a plurality of outside protrusions 46A that protrude from an outer peripheral surface of the roller body 45A and extend along an axis of the roller body 45A. The plurality of outside protrusions 46A are arranged so as to be separated from each other in a circumferential direction of the roller body 45A.

The roller body 45A and the outside protrusions 46A that constitute the driving roller 44A can be configured using a timing pulley made of steel, or can be integrally formed of resin, such as nylon or polyoxymethylene (POM).

Figure 7:
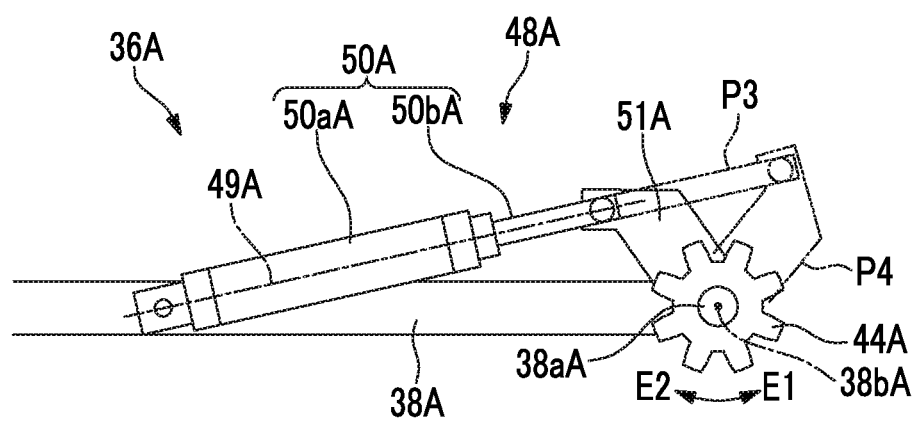
FIG. 7 is a plan view of a holding arm and a rotational driving unit of the integrated conveying lane.

As illustrated in FIG. 7, a rotational driving unit 48A for rotating the driving roller 44A is attached to the holding arm 38A.

The rotational driving unit 48A, as illustrated in FIGS. 5 and 7, has an air cylinder 50A that is driven to move forward and backward on a straight line 49A, a link member 51A that is rotatably connected to a tip part of the air cylinder 50A in a forward movement direction, and a well-known clutch mechanism 52A that is attached to the link member 51A. In addition, the link member 51A and the clutch mechanism 52A constitute a converting unit 53A.

The air cylinder 50A, as illustrated in FIG. 7, is configured so that a rod (rod-shaped member) 50bA is inserted into a cylinder body 50aA so as to be capable of moving forward and backward with respect to the cylinder body 50aA. A cylinder driving unit 50cA (refer to FIG. 2), such as an air compressor, capable of supplying and discharging compressed air, is connected to the cylinder body 50aA via a tube (not illustrated).

If compressed air is supplied to a head side within the cylinder body 50aA by the cylinder driving unit 50cA, the rod 50bA moves forward with respect to the cylinder body 50aA. On the other hand, if compressed air is supplied to a rod side within the cylinder body 50aA by the cylinder driving unit 50cA, the rod 50bA moves backward with respect to the cylinder body 50aA.

In addition, in the present embodiment, the air cylinder 50A that is a linear motion part is driven with compressed air. However, the linear motion part may be driven with hydraulic pressure, magnetism, or the like.

A tip part of the rod 50bA in the forward movement direction and a first end of the link member 51A are rotatably connected together with a pin of which the reference sign is omitted.

As illustrated in FIG. 5, a second end 51aA of the link member 51A is formed in a cylindrical shape. The shaft member 38aA of the holding arm 38A is inserted into a tube hole of the second end 51aA so as to be rotatable with respect to the second end 51aA. The aforementioned clutch mechanism 52A is fixed to an outer peripheral surface of the second end 51aA. The clutch mechanism 52A is arranged within a tube hole of the roller body 45A of the driving roller 44A.

The clutch mechanism 52A restricts that the driving roller 44A rotates in a direction E1 around an axis 38bA of the shaft member 38aA with respect to the clutch mechanism 52A. On the other hand, the clutch mechanism allows the driving roller 44A to rotate in a direction E2 around the axis 38bA with respect to the clutch mechanism 52A.

In the rotational driving unit 48A configured in this way, if the rod 50bA moves forward as illustrated by a position P3 of FIG. 7 with respect to the cylinder body 50aA, the link member 51A rotates in the direction E2 around the axis 38bA, and moves to a position P4. In this case, the clutch mechanism 52A and the driving roller 44A are connected together, and the clutch mechanism 52A and the driving roller 44A rotate in the direction E2 around the axis 38bA together with the second end 51aA of the link member 51A.

On the other hand, if the rod 50bA has move backward with respect to the cylinder body 50aA, the link member 51A rotates in the direction E1 around the axis 38bA. In this case, the connection between the clutch mechanism 52A and the driving roller 44A is released, and the driving roller 44A does not rotate (idles).

In this way, the clutch mechanism 52A allows the rotation of the driving roller 44A in only the direction E2 around the axis 38bA with respect to the second end 51aA of the link member 51A.

The converting unit 53A converts a force for the forward and backward movement driving of the air cylinder 50A into the rotative force of the driving roller 44A in the direction E2 around the axis 38bA.

The rotational driving unit 48A includes the air cylinder 50A and the converting unit 53A, and the driving roller 44A rotates in the direction E2 by a movement in which the air cylinder 50A is driven to move forward and backward on the straight line 49A being converted by the converting unit 53A.

If the cylinder driving unit 50cA performs forward movement and backward movement of the rod 50bA, the driving roller 44A rotates at a constant angle around the axis 38bA.

By repeating a set of forward movement and backward movement of the rod 50bA a predetermined number of times, so-called predetermined inching driving in which the driving roller 44A rotates a predetermined multiple number of times of a constant angle.

A driven roller 57A illustrated in FIG. 3 is rotatably supported by the second end of the holding arm 39A. The driven roller 57A is driven according to the tire T that rotated as will be described below.

The support member 26B is provided with a second positioning unit 36B. The first positioning unit 36A and the second positioning units 36B constitute a center position adjusting mechanism 59.

The holding arm 38B of the second positioning unit 36B is arranged closer to the upstream side D1 than the holding arm 39B.

The first positioning unit 36A and the second positioning unit 36B are arranged so as to face each other the end of the split conveying lane 15 on the downstream side D2 interposed therebetween.

In the center position adjusting mechanism 59 configured in this way, a tire detecting sensor 61 (refer to FIG. 2) detects that the tire T conveyed by the conveying unit 10 has arrived at a marking position P1 specified between the first positioning unit 36A and the second positioning unit 36B. As the tire detecting sensor 61, well-known contact type or non-contact-type sensors can be appropriately selected and used.

The tire detecting sensor 61 transmits the detection result to the control unit 140.

When the tire detecting sensor 61 detects that the tire T has arrived at the marking position P1, the following control is performed.

In addition, at a normal time when the center position adjusting mechanism 59 does not adjust the position of the tire T, the holding arms 38A, 39A, 38B, and 39B are arranged so as to become parallel to the conveying direction D of the tire T, and there is no hindrance to conveyance of the tire T.

The arm drive motors 40A, 41A, 40B, and 41B are driven to rotate the holding arms 38A, 39A, 38B, and 39B to make the rollers 44A, 57A, 44B, and 57B abut against a tread T2 of the tire T from a plurality of positions in the circumferential direction.

If the driving rollers 44A and 44B are rotated through inching driving by the cylinder driving units 50cA and 50cB, the tire T rotates in a predetermined direction around the axis T6.

If the tire T rotates, the driven rollers 57A and 57B are driven and cororated.

The position of the axis T6 of the tire T is adjusted (the tire T is aligned) by inching-driving the driving rollers 44A and 44B.

In this way, in the present embodiment, the driving rollers 44A and 44B of the center position adjusting mechanism 59 that adjusts the position of the tire T also serve as rotational position adjusting rollers that rotate the tire T around the axis T6.

Figure 8:
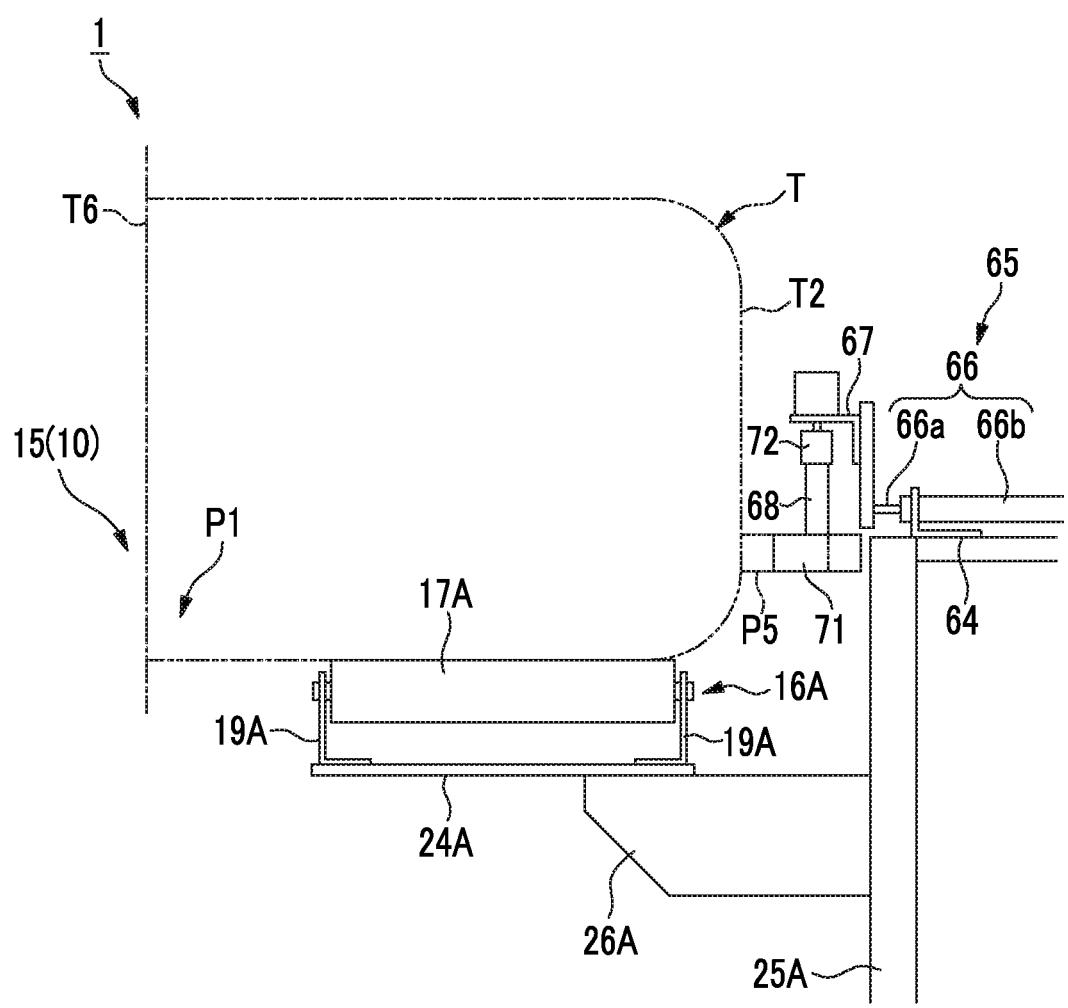
FIG. 8 is a front view of a rotational amount detecting unit of the tire marking apparatus.

As illustrated in FIG. 8, a rotational amount detecting unit 65 is attached to the leg 25A via a support member 64.

In the rotational amount detecting unit 65, a rotating shaft 68 is attached to a tip part of a rod 66a of an air cylinder 66 via a coupling member 67. The rod 66a is inserted into a cylinder body 66b of the air cylinder 66 so as to be capable of moving forward and backward. The cylinder body 66b is fixed to the leg 25A by the aforementioned support member 64.

A cylinder driving unit 70 (refer to FIG. 2) is connected to the cylinder body 66b via a tube (not illustrated).

If compressed air is supplied to a head side within the cylinder body 66b by the cylinder driving unit 70, the rod 66a moves forward with respect to the cylinder body 66b. On the other hand, if compressed air is supplied to a rod side within the cylinder body 66b by the cylinder driving unit 70, the rod 66a moves backward with respect to the cylinder body 66b.

The rotating shaft 68 is arranged so as to be orthogonal to the horizontal plane. The rotating shaft 68 is supported by the coupling member 67 so as to be rotatable around an axis of the rotating shaft 68.

A detection roller 71 is attached to a lower end of the rotating shaft 68, and an encoder 72 is attached to an upper part of the rotating shaft. When the rod 66a has moved forward, the detection roller 71 moves to a position P5, and a side surface of the detection roller 71 abuts against the tread T2 of the tire T at the marking position P1. There is a constant relationship between the rotational amount (rotational angle) by which the tire T rotates around the axis T6 and the rotational amount by which the rotating shaft 68 rotates around its axis.

The encoder 72 detects the rotational amount of the rotating shaft 68 and corrects the detection result to detect the rotational amount of the tire T. The encoder 72 transmits the detection result to the control unit 140.

Figure 9:
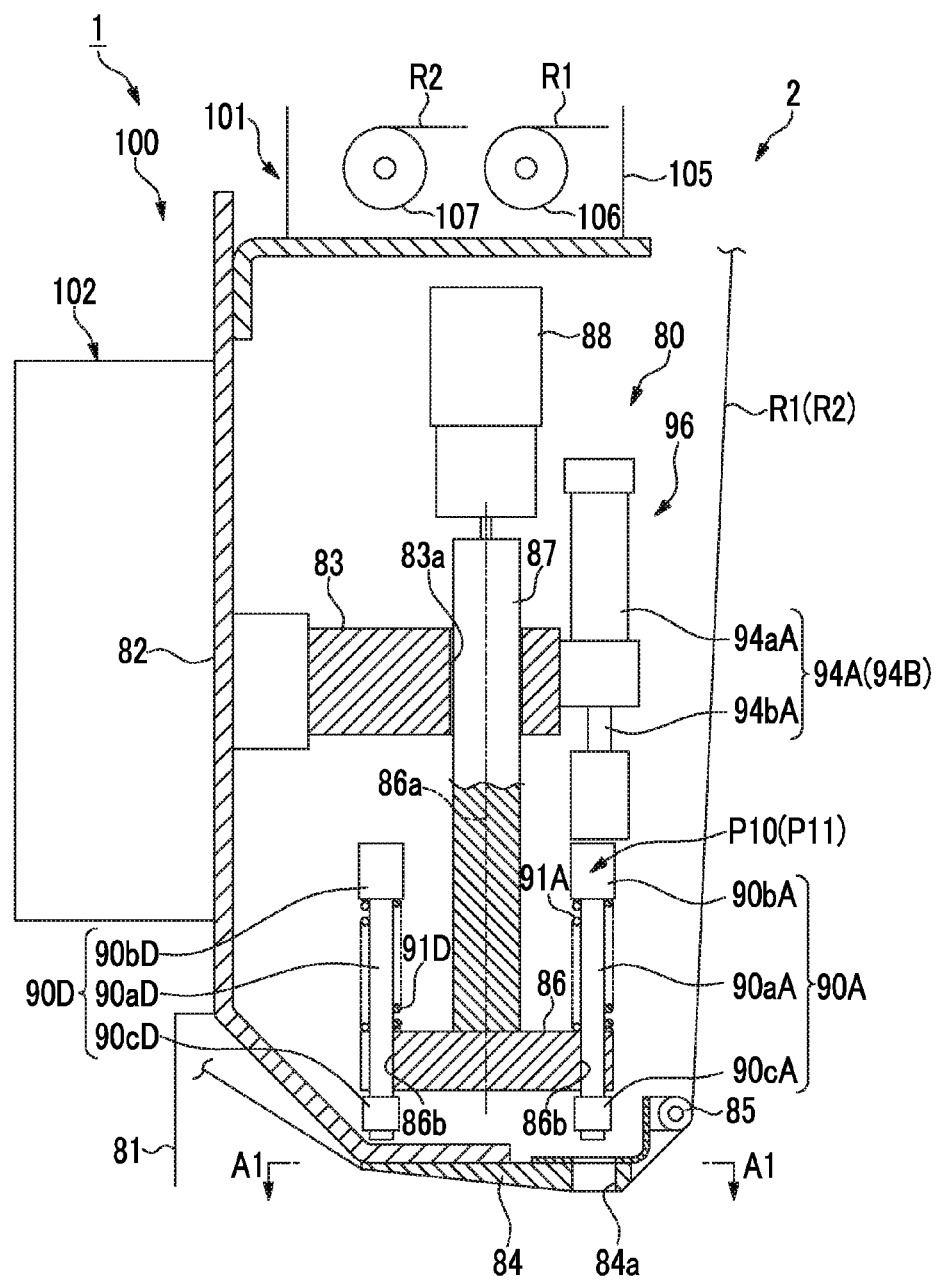
FIG. 9 is a front view when a head unit and a ribbon supplying mechanism of the tire marking apparatus are partially broken.

In the head unit 80, as illustrated in FIGS. 1 and 9, a base 82 is supported on a supporting base 81. A coupling member 83 in which a through-hole 83a is formed is attached to an upper part of the base 82. The through-hole 83a extends in the upward-downward direction.

Figure 10:
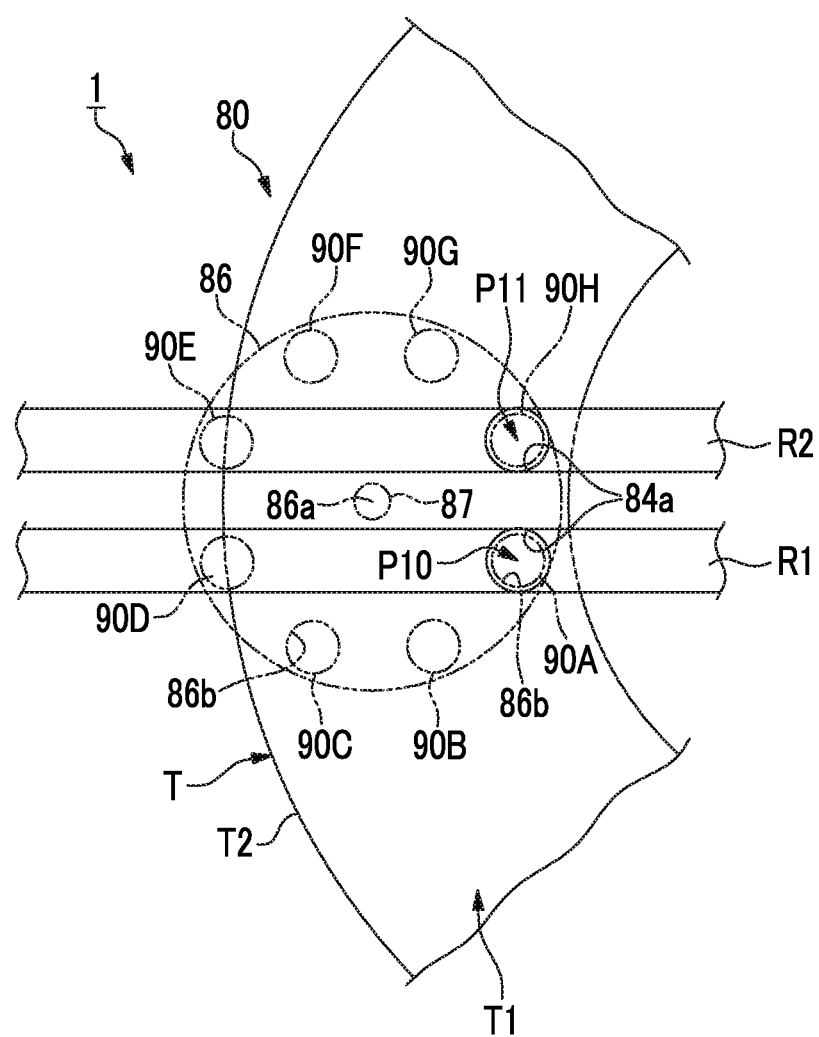
FIG. 10 is a cross-sectional view taken along cutting line A1-A1 in FIG. 9.

As illustrated in FIG. 9, a guide plate 84 is attached to a lower end of the base 82. As illustrated in FIGS. 9 and 10, a pair of through-holes 84a are formed in the guide plate 84. In addition, only the pair of through-holes 84a in the guide plate 84 are illustrated in FIG. 10.

The pitch of the pair of through-holes 84a is equal to the pitch of printing pins adjacent to each other in a circumferential direction of a turntable 86 among printing pins 90A to 90H to be described below. In the upward-downward direction, the positions of the printing pins 90A to 90H or ink ribbons R1 and R2 (to be described below) that overlap the pair of through-holes 84a are printing positions P10 and P11. The printing positions P10 and P11 face the sidewall T1 of the tire T arranged at the marking position P1.

A guide roller 85 for guiding the ink ribbons R1 and R2 to be described below is attached to the guide plate 84.

A rod 87 attached on a central axis (rotational axis) 86a of the disk-shaped turntable (disk part) 86 is inserted through the through-hole 83a of the coupling member 83 so as to be rotatable with respect to the through-hole 83a of the coupling member 83.

Eight through-holes 86b are formed at equal intervals around the central axis 86a in the turntable 86. The central axis 86*a* of the turntable 86 is adjusted so as to be substantially perpendicular (also including perpendicularly) to the sidewall T1 of the tire T at the marking position P1.

Heating means 86*c* (refer to FIG. 2) having a heater or the like is arranged within the turntable 86. The heating means 86*c* applies predetermined electric power to the heater, thereby heating the printing pins 90A to 90H to be described below.

A motor or an air-indexing disk rotational driving device (disk driving unit) 88, which rotates the turntable 86 around the central axis 86*a* via the rod 87, is attached to an upper end of the rod 87. The disk rotational driving device 88 is fixed to the coupling member 83. Eight printing pins 90A to 90H are arranged at equal intervals, that is, at every 45° around the central axis 86*a* in the turntable 86, as will be described below. For this reason, the disk rotational driving device 88 just has to rotate the turntable 86 in units of 45° that is a central angle with respect to the printing pins 90A to 90H adjacent to each other around the central axis 86*a*.

Eight printing pins (printing parts) 90A to 90H are respectively inserted through the through-holes 86*b* of the turntable 86 so as to be movable in the upward-downward direction. In addition, the printing pins 90A to 90H are short for the printing pins 90A, 90B, 90C, 90D, 90E, 90F, 90G, and 90H.

That is, the eight printing pins 90A to 90H are arranged at equal intervals around the central axis 86*a*. As the eight printing pins 90A to 90H are arranged around the central axis 86*a*, even if the number of printing pins included in the head unit 80 increases, the overall outer shape of the printing pins 90A to 90H is suppressed compared to a case where the printing pins 90A to 90H are linearly arranged side by side.

The printing pin 90A is configured such that diameter-enlarged parts 90*b*A and 90*c*A are provided at an upper end and a lower end of a rod-shaped pin body 90*a*A (configurations corresponding to the pin body 90*a*A and the diameter-enlarged parts 90*b*A and 90*c*A in the printing pins 90B, 90C, 90E, 90F, 90G, and 90H are not illustrated).

Although not illustrated, a shape protruding from a lower surface, such as a circular shape or a triangular shape, is formed in a lower surface of the pin body 90*a*A. The pin body 90*a*A is inserted into the through-hole 86*b* of the turntable 86. The diameter-enlarged parts 90*b*A and 90*c*A are respectively arranged above and below the turntable 86.

A coil spring 91A is arranged between a lower surface of diameter-enlarged part 90*b*A of the printing pin 90A and an upper surface of the turntable 86 (coil springs 91*a*B, 91*a*C, 91E, 91F, 91G and 91H are not illustrated). The coil spring 91A is inserted through the pin body 90*a*A.

The coil spring 91A biases the diameter-enlarged part 90*b*A of the printing pin 90A upward. In a state where an air cylinder 94A (to be described below) does not bias the printing pin 90A downward, a lower surface of the printing pin 90A is arranged above the guide plate 84.

Air cylinders 94A and 94B are attached to the coupling member 83.

The air cylinder 94A is configured so that a rod 94*b*A is inserted into the cylinder body 94*a*A so as to be capable of moving forward and backward in the upward-downward direction with respect to the cylinder body 94*a*A (the cylinder body 94*a*B and the rod 94*b*B are not illustrated).

The cylinder body 94*a*A is attached to the coupling member 83. A cylinder driving unit 95A (refer to FIG. 2) illustrated in FIG. 2 is connected to the cylinder body 94*a*A via a tube (not illustrated). In addition, the air cylinders 94A and 94B and the cylinder driving units 95A and 95B constitute a printing driving unit 96. The air cylinders 94A and 94B are arranged above the printing positions P10 and P11.

If compressed air is supplied to a head side within the cylinder body 94*a*A by the cylinder driving unit 95A, the rod 94*b*A moves downward with respect to the cylinder body 94*a*A. In this case, the lower surface of the printing pin 90A protrudes below the lower surface of the guide plate 84 by moving the printing pin 90A forward against the biasing force of the coil spring 91A.

When the heated printing pin 90A presses the ink ribbon R1 (to be described below) against the sidewall T1 of the tire T, marking (printing) is performed in the tire T.

On the other hand, if compressed air is supplied to a rod side within the cylinder body 94*a*A by the cylinder driving unit 95A, the biasing force of the coil spring 91A is received and the rod 94*b*A upwardly moves backward with respect to the cylinder body 94*a*A.

In this way, the printing pin 90A is provided in the turntable 86 so as to be capable of moving forward and backward with respect to the sidewall T1 of the tire T. The printing driving unit 96 simultaneously moves two printing pins, which are arranged at the printing positions P10 and P11 among the printing pins 90A to 90H, forward and backward.

The ribbon supplying mechanism 100, as illustrated in FIG. 9, has a ribbon supplying unit 101 and a ribbon winding unit 102 that are fixed to the base 82 of the head unit 80.

The ribbon supplying unit 101 has a well-known configuration. In the ribbon supplying unit 101, a first supply roller 106 and a second supply roller 107 are rotatably supported by an auxiliary base 105 fixed to the base 82.

For example, a red ink ribbon R1 is wound around the first supply roller 106. A heat transfer type ribbon to which ink is transferred by being pressed and heated is used as the ink ribbon R1.

The ink ribbon R1 pulled out and supplied from the first supply roller 106 is guided to the lower surface of the guide plate 84 after being wound around the guide roller 85 or the like so that constant tension acts on the ink ribbon R1. The ink ribbon R1 passes through the printing position P10 of the lower surface of the guide plate 84. That is, the ink ribbon R1 is arranged between the printing pin 90A at the printing position P10 and the tire T.

Similarly, for example, a yellow ink ribbon R2 is wound around the second supply roller 107. The ink ribbon R2 pulled out and supplied from the second supply roller 107 is guided to the lower surface of the guide plate 84 after being wound around the guide roller 85 or the like so that constant tension acts on the ink ribbon R2. The ink ribbon R2 passes through the printing position P11 of the lower surface of the guide plate 84.

Each of the ink ribbons R1 and R2 faces a lower surface of any one among the printing pins 90A to 90H across the through-holes 84*a* of the guide plate 84 (refer to FIG. 10).

Figure 11:
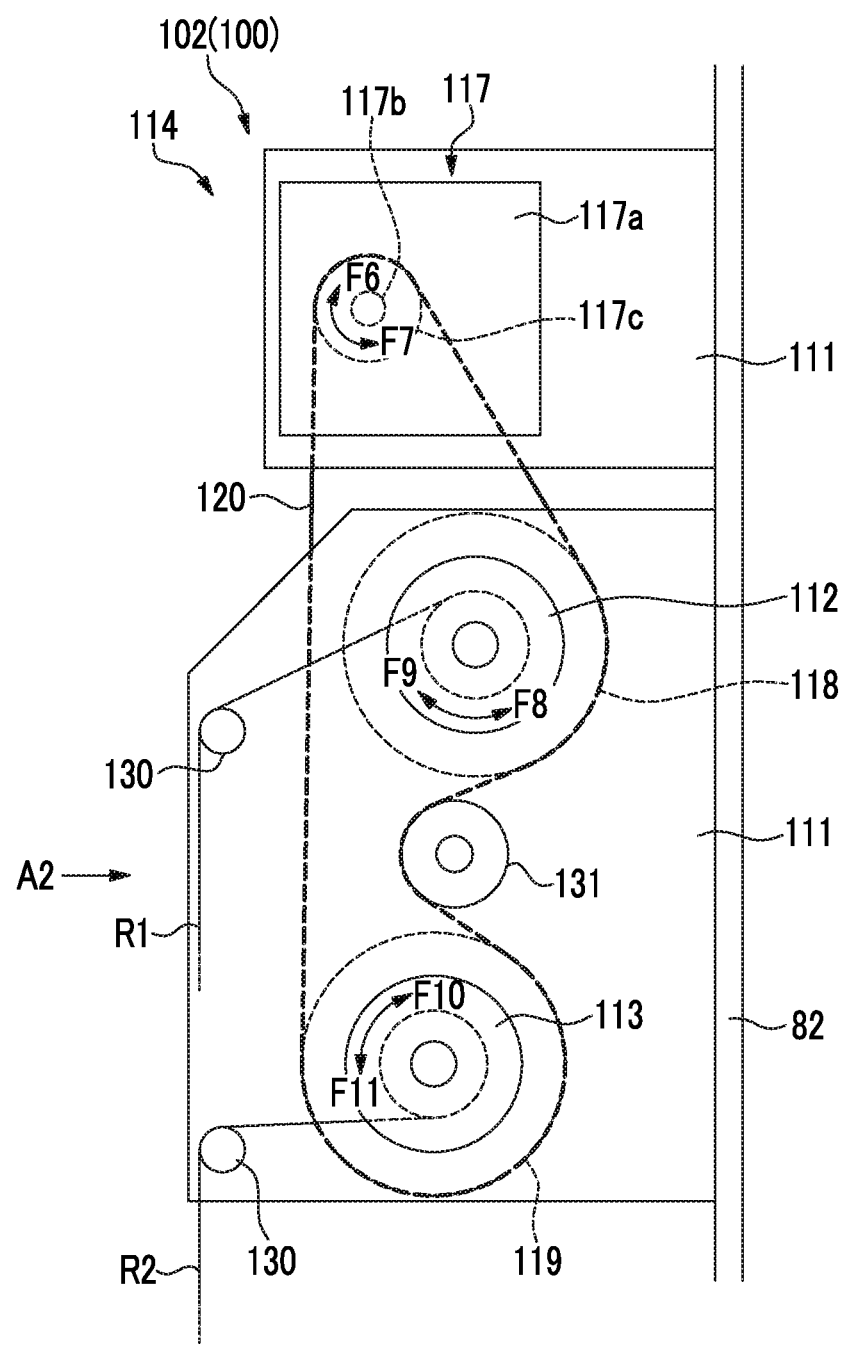
FIG. 11 is a front view of the ribbon supplying mechanism.
Figure 12:
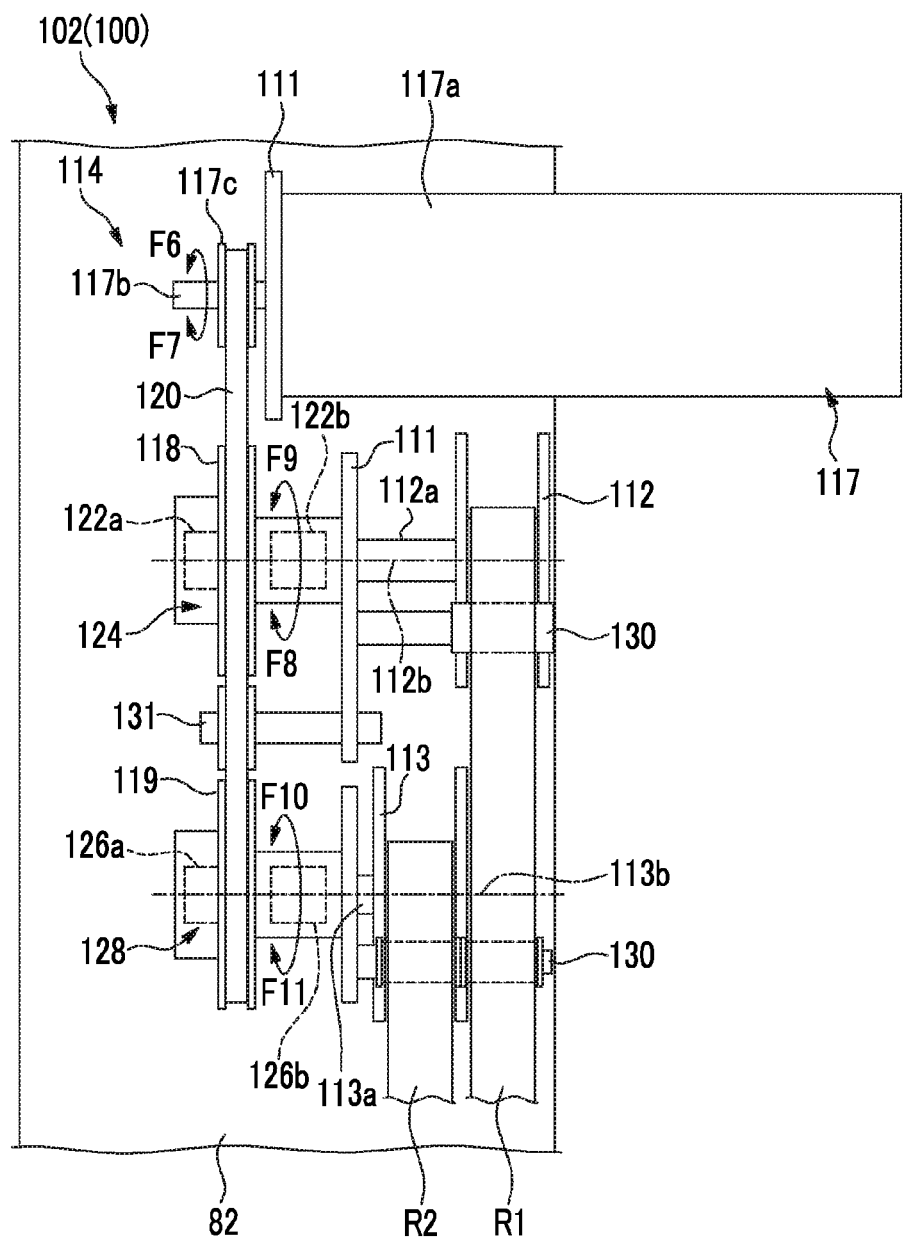
FIG. 12 is a view as viewed from the direction of arrow A2 in FIG. 11.

As illustrated in FIGS. 11 and 12, in the ribbon winding unit 102, a first winding roller 112 and a second winding roller 113 are rotatably supported by a support member 111 fixed to the base 82 of the head unit 80. A roller driving unit 114 that rotates the first winding roller 112 and the second winding roller 113 is attached to the support member 111.

The roller driving unit 114 has one winding motor (rotational driving device) 117, a first pulley (first driven wheel) 118 coaxially attached to the first winding roller 112, a second pulley (second driven wheel) 119 coaxially attached to the second winding roller 113, and one belt (annular member) 120 connected to the first pulley 118, the second pulley 119, and a rotating shaft 117b of the winding motor 117, respectively.

In the present embodiment, the winding motor 117 is an electric motor in which the rotating shaft 117b is rotatable in a normal direction F6 and a reverse direction F7 with electric power with respect to a motor body 117a. The motor body 117a is attached to the base 82 by the aforementioned support member 111. A motor pulley 117c is attached to the rotating shaft 117b.

The first pulley 118 and the second pulley 119 are rotatably supported by the support member 111. The motor pulley 117c of the winding motor 117, the first pulley 118, and the second pulley 119 are rotatably supported on the same plane.

Figure 13:
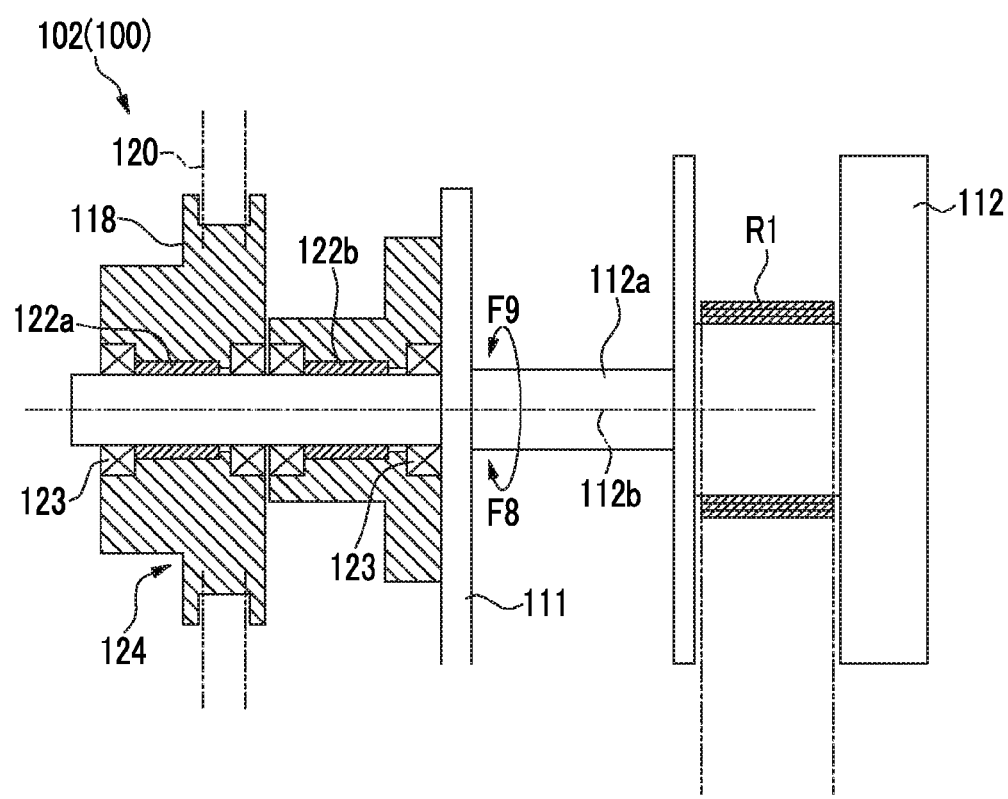
FIG. 13 is a sectional view of a first pulley of the ribbon supplying mechanism.

As illustrated in FIG. 13, the first pulley 118 is attached to a shaft member 112a of the first winding roller 112 via well-known first clutch mechanisms 122a and 122b and a well-known first bearing 123. In addition, the first pulley 118, the first clutch mechanisms 122a and 122b, and the belt 120 constitute a first transmission mechanism 124. The shaft member 112a is rotatably inserted through a through-hole (not illustrated) formed in the support member 111.

The first clutch mechanism 122a decouples the first pulley 118 from the shaft member 112a in the direction F8 and couples the first pulley 118 to the shaft member 112a in the direction F9. Accordingly, the rotation of the shaft member 112a in the direction F8 around an axis 112b with respect to the rotation of the first pulley 118 is restricted, and the rotation thereof in the direction F9 is allowed.

At this time, the first clutch mechanism 122b serves as a brake that restricts the rotation of the shaft member 112a in the direction F8, while the first clutch mechanism allows the rotation of the shaft member in the direction F9.

The bearing 123 supports the shaft member 112a so that the shaft member smoothly rotates with respect to the first pulley 118.

The ink ribbon R1 is wound around the first winding roller 112.

The second pulley 119 is configured similar to the first pulley 118. That is, as illustrated in FIG. 12, the second pulley 119 is attached to a shaft member 113a of the second winding roller 113 via second clutch mechanisms 126a and 126b and a bearing (not illustrated). In addition, the second pulley 119, the second clutch mechanisms 126a and 126b, and the belt 120 constitute the second transmission mechanism 128. The belt 120 serves as both the first transmission mechanism 124 and the second transmission mechanism 128.

A direction in which the second clutch mechanism 126a is coupled to the shaft member 113a and rotates the shaft member 113a is a direction reverse to that in the first clutch mechanism 122a. That is, the second clutch mechanism 126a decouples the second pulley 119 from the shaft member 113a in a direction F10 and couples the second pulley 119 to the shaft member 113a in a direction F11. Accordingly, the rotation of the shaft member 113a in the direction F10 around an axis 113b with respect to the rotation of the second pulley 119 is restricted, and the rotation thereof in a direction F11 is allowed.

At this time, the second clutch mechanism 126b serves as a brake that restricts the rotation of the shaft member 113a in the direction F10, while the second clutch mechanism allows the rotation of the shaft member in the direction F11.

The second winding roller 113 is arranged at a position shifted in a width direction of the first winding roller 112 with respect to the first winding roller 112. The ink ribbon R2 is wound around the second winding roller 113.

In order to enhance the tension that acts on the ink ribbon R1 and the R2, a guide roller 130 is attached to the support member 111.

The aforementioned belt 120 is wound around the motor pulley 117c, the first pulley 118, and the second pulley 119. In order to enhance the tension that acts on the belt 120, a guide pulley 131 is attached to the support member 111.

In the ribbon supplying mechanism 100 configured in this way, if the rotating shaft 117b of the winding motor 117 is rotated in the normal direction F6, the first pulley 118 rotates in the direction F9, and the second pulley 119 rotates in the direction F10. The first pulley 118 and the second pulley 119 are rotated via the belt 120 by the rotating shaft 117b of the winding motor 117.

In this case, the first pulley 118 and the shaft member 112a are coupled together by the first clutch mechanism 122a, and the first winding roller 112 rotates in the direction F9 together with the first pulley 118. Since the second pulley 119 and the second shaft member 113a are decoupled in the second clutch mechanism 126a, the second winding roller 113 does not rotate even if the second pulley 119 rotates in the direction F10.

That is, if the rotating shaft 117b of the winding motor 117 is rotated in the normal direction F6, the ink ribbon R1 is wound by the first winding roller 112, but the ink ribbon R2 is not wound. The ink ribbon R1 is pulled out from the first supply roller 106 of the ribbon supplying unit 101.

On the other hand, if the rotating shaft 117b of the winding motor 117 is rotated in the reverse direction F7, the first pulley 118 rotates in the direction F8, and the second pulley 119 rotates in the direction F11. In this case, since the first pulley 118 and the shaft member 112a are decoupled in the first clutch mechanism 122a, the first winding roller 112 does not rotate even if the first pulley 118 rotates in the direction F8. The shaft member 113a is coupled to the second clutch mechanism 126a, and the second winding roller 113 rotates in the direction F11 together with the second pulley 119.

That is, if the rotating shaft 117b of the winding motor 117 is rotated in the reverse direction F7, the ink ribbon R2 is wound by the second winding roller 113, but an ink ribbon R2 does not rotate. The ink ribbon R2 is pulled out from the second supply roller 107.

In this way, the first transmission mechanism 124 transmits only the rotation of the rotating shaft 117b of the winding motor 117 in the normal direction F6 to the first winding roller 112. Only when the rotating shaft 117b rotates in the normal direction F6, the ink ribbon R1 is wound by the first winding roller 112.

The second transmission mechanism 128 transmits only the rotation of the rotating shaft 117b of the winding motor 117 in the reverse direction F7 to the second winding roller 113. Only when the rotating shaft 117b rotates in the reverse direction F7, the ink ribbon R2 is wound by the second winding roller 113.

A rotational driving device required in order to wind the ink ribbons R1 and R2 is one winding motor 117.

The ribbon supplying mechanism 100 winds the ink ribbons R1 and R2 arranged between the printing pins 90A and 90H at the printing positions P10 and P11 and the tire T.

The control unit 140, as illustrated in FIG. 2, has a controller 142 connected to a bus 141. The roller driving motors 20A, 20B, and 34 of the conveying unit 10, the arm driving cylinders 42A and 42B, the cylinder driving units 50cA, 50cB, 70, the tire detecting sensor 61, the encoder 72, the heating means 86c of the head unit 80, the disk rotational driving device 88, the cylinder driving units 95A and 95B, and the winding motor 117 of the ribbon supplying mechanism 100 are connected to the bus 141.

The controller 142 is constituted of a timer, an arithmetic element, a memory, a control program, or the like.

Next, the operation of the marking apparatus 1 configured as described above will be described. If the marking apparatus 1 is started, the controller 142 of the control unit 140 rotates the rotating shafts of the roller driving motors 20A, 20B, and 34 in the normal direction. The driving rollers 17A, 17B, and 31 rotate in the normal direction F1. By heating the turntable 86 by the heating means 86c, the printing pins 90A to 90H are heated to a predetermined temperature.

The tire T that has finished a predetermined test and inspection using a testing device, such as a tire uniformity machine, is arranged on the split conveying lane 15.

The tire T is arranged on the split conveying lane 15 in a state where circumferential positions where marking is performed are adjusted by the testing device.

The tire T is conveyed from the upstream side D1 toward the downstream side D2 by the driving rollers 17A and 17B. Information, such as the external diameter of the tire T, the shape or color of marking performed in the tire T, and the like, is transmitted from the testing device to the control unit 140 of the marking apparatus 1.

In this example, description will be made supposing that the instruction of marking, for example, red circular shapes, yellow triangular shapes, red square shapes, and yellow X-shapes side by side in the circumferential direction of the tire T is transmitted from the testing device.

If the tire T is conveyed to the marking position P1, the tire detecting sensor 61 detects that the tire T has arrived at the marking position P1, and transmits the detection result to the controller 142 of the control unit 140.

The controller 142 drives the arm driving cylinders 42A and 42B, and makes the rollers 44A, 57A, 44B, and 57B abut against the tread T2 of the tire T. In this case, the rollers 44A, 57A, 44B, and 57B move to the position P6 of FIG. 3.

In order to perform first marking, the cylinder driving units 95A and 95B are driven, and the two printing pins 90A and 90H and the rods 94bA and 94bB of the air cylinders 94A and 94B are simultaneously moved forward. By the ink ribbons R1 and R2 being pressed and heated, for example, marking of red circular shapes and yellow triangular shapes in the sidewall T1 of the tire T is performed side by side in the circumferential direction of the tire T. Since two marks are formed at a time, the marking to be performed in the tire T becomes efficient compared to a case where marks are formed one by one in the tire T.

The cylinder driving units 95A and 95B are driven to move the printing pins 90A and 90H backward. The disk rotational driving device 88 is driven to rotate the turntable 86, arrange the printing pin 90C at the printing position P10, and arrange the printing pin 90B at the printing position P11.

The winding motor 117 is driven to rotate the rotating shaft 117b in the normal direction F6. The first winding roller 112 rotates in the direction F9, and the ink ribbon R1 is wound by a fixed length by the first winding roller 112.

Moreover, the winding motor 117 is driven to rotate the rotating shaft 117b in the reverse direction F7. The second winding roller 113 rotates in the direction F11, and the ink ribbon R2 is wound by a fixed length by the second winding roller 113.

If the controller 142 drives the cylinder driving unit 70 to move the rod 66a forward, the side surface of the detection roller 71 abuts against the tread T2 of the tire T.

The controller inching-drives the driving rollers 44A and 44B a predetermined number of times, and rotates the tire T around the axis T6 by a predetermined target rotational amount. By the outside protrusion 46A being formed in the driving roller 44A, the frictional force between the driving roller 44A and the tire T can be enhanced. If the driving rollers 44A and 44B rotate the tire T around the axis T6, the driven rollers 57A and 57B are driven and rotated according to the rotating tire T.

In this case, the detection roller 71 that has abutted against the tire T rotates around its axis. The rotational amount detecting unit 65 detects the rotational amount of the tire T, converts the detected rotational amount of the tire T into a signal to transmit the signal to the controller 142, and checks whether the tire has been rotated by the predetermined target rotational amount.

When this rotational amount is smaller than the target rotational amount, even if the driving rollers 44A and 44B are inching-driven, it is considered that there is slipping between the driving rollers 44A and 44B and the tire T and the tire T does not sufficiently rotate. In this case, the controller 142 further drives the cylinder driving units 50cA and 50cB to move the rods 50bA and 50bB of the air cylinders 50A and 50B forward.

Next, in order to perform second marking, the cylinder driving units 95A and 95B are driven to move the two printing pins 90C and 90B forward. By the ink ribbons R1 and R2 being pressed and heated, for example, marking of red square shapes and yellow X-shapes in the sidewall T1 of the tire T is performed side by side in the circumferential direction of the tire T with respect to marking of circular shapes and triangular shapes.

In this way, marking after the second marking can be sequentially performed at a position shifted in the circumferential direction from the position where the first marking is performed in the tire T.

In this way, the printing device 2 can perform marking in the tire T with the pair of ink ribbons R1, and R2.

If the controller 142 drives the cylinder driving unit 70 to move the rod 66a backward, the detection roller 71 is separated from the tread T2 of the tire T.

The controller drives the arm driving cylinders 42A and 42B to separate the rollers 44A, 57A, 44B, and 57B from the tire T.

The tire T in which four marks have been formed is conveyed from the marking position P1 toward the downstream side D2 by the integrated conveying lane 30.

As described above, according to the printing device 2 and the marking apparatus 1 of the present embodiment, the ink ribbon R1 is wound by the first winding roller 112 by rotating the rotating shaft 117b of one winding motor 117 in the normal direction F6. Similarly, the ink ribbon R2 is wound by the second winding roller 113 by rotating the rotating shaft 117b of the winding motor 117 in the reverse direction F7. In this way, the number of winding motors 117 required in order to wind the pair of ink ribbons R1 and R2 can be one, and the roller driving unit 114 can be simply configured.

The belt 120 is connected to the first pulley 118, the second pulley 119, and the motor pulley 117c, which are attached to the rotating shaft 117b of the winding motor 117, respectively. Since one belt 120 just has to be used for rotating the first pulley 118 and the first second pulley 119 by the rotating shaft 117b of the winding motor 117, the overall configuration of the first transmission mechanism 124 and the second transmission mechanism 128 can be simplified.

Additionally, according to the marking apparatus 1 of the present embodiment, the marking apparatus 1 can also be simply configured by simply configuring the roller driving unit 114.

Although the one embodiment of the invention has been described above in detail with reference to the drawings, the specific configuration is not limited to this embodiment, and changes, combinations, deletions, or the like of the configuration are also included without departing from the scope of the invention.

For example, in the above embodiment, it is supposed that the first transmission mechanism 124 has one belt 120 that is connected to the first pulley 118, the second pulley 119, and the rotating shaft 117b of the winding motor 117, respectively. However, the first transmission mechanism 124 may be configured to include two belts such that a first belt connects the first pulley 118 and the rotating shaft 117b and a second belt connects a second pulley 119 and the rotating shaft 117b.

As for the belt 120, the driving force of the winding motor 117 may be transmitted not by the configuration of a belt and a pulley but by a gear such that an intermediate gear is thrown according to the respective rotational directions.

It is supposed that the rotational driving device is the winding motor 117 that is an electric motor. However, the rotational driving device may be an air motor, an index unit, or the like. The same applies to the roller driving motors 20A, 20B, and 34.

Additionally in the clutch mechanism of the present embodiment, a simple structure is realized by using a one-way clutch that allows rotation only in one direction. However, by actively performing connection with or release from the rotating shaft of the rotational driving device by using electromagnetism or an air clutch for the clutch mechanism, it is also possible to drive three or more winding rollers by one rotational driving device.

Although it is supposed that the printing device 2 performs marking in the tire T, a target for which the printing device 2 performs marking is not limited to the tire T. This target may include, for example, various parts or the like relating to automobiles, relating to construction, and relating to electricity.

INDUSTRIAL APPLICABILITY

The invention can be applied to printing devices that rotate a pair of winding rollers to wind ink ribbons and perform marking.

REFERENCE SIGNS LIST

1: MARKING APPARATUS (TIRE MARKING APPARATUS)
2: PRINTING DEVICE
106: FIRST SUPPLY ROLLER
107: SECOND SUPPLY ROLLER
112: FIRST WINDING ROLLER
113: SECOND WINDING ROLLER
114: ROLLER DRIVING UNIT
117: WINDING MOTOR (ROTATIONAL DRIVING DEVICE)
118: FIRST PULLEY (FIRST DRIVEN WHEEL)
119: SECOND PULLEY (SECOND DRIVEN WHEEL)
120: BELT (ANNULAR MEMBER)
124: FIRST TRANSMISSION MECHANISM
128: SECOND TRANSMISSION MECHANISM
F6: NORMAL DIRECTION
F7: REVERSE DIRECTION
P10, P11: PRINTING POSITION
R1, R2: INK RIBBON
T: TIRE

The invention claimed is:

1. A printing device capable of performing printing with a pair of ink ribbons, comprising:
   a first supply roller and a second supply roller that supply the pair of ink ribbons;
   a first winding roller and a second winding roller that are pulled out from the first supply roller and the second supply roller and wind the pair of ink ribbons passing through a printing position; and
   a roller driving unit that rotates the first winding roller and the second winding roller,
   wherein the roller driving unit includes
   one rotational driving device in which a rotating shaft is rotatable in a normal direction and a reverse direction,
   a first transmission mechanism that transmits only the rotation of the rotating shaft in the normal direction to the first winding roller, and
   a second transmission mechanism that transmits only the rotation of the rotating shaft in the reverse direction to the second winding roller.

2. The printing device according to claim 1,
   wherein the first transmission mechanism includes a first driven wheel coaxially attached to the first winding roller,
   wherein the second transmission mechanism includes a second driven wheel coaxially attached to the second winding roller and rotatable on the same plane as the first driven wheel, and
   wherein the roller driving unit includes one annular member connected to the first driven wheel, the second driven wheel, and the rotating shaft of the rotational driving device, respectively.

3. A tire marking apparatus comprising the printing device according to claim 1 and performing marking in a tire.

\* \* \* \* \*

UNITED STATES PATENT AND TRADEMARK OFFICE
CERTIFICATE OF CORRECTION

PATENT NO.         : 9,579,930 B2
APPLICATION NO.    : 14/910901
DATED              : February 28, 2017
INVENTOR(S)        : Yasutaka Seimoto et al.

It is certified that error appears in the above-identified patent and that said Letters Patent is hereby corrected as shown below:

In the Claims

Please change Claim 1, Line 4, from "...that are pulled out from the first supply roller and the second supply roller and wind the pair of ink ribbons..." to ---...that wind the pair of ink ribbons which are pulled out from the first supply roller and the second supply roller and...---

Signed and Sealed this
Twenty-third Day of April, 2019

Andrei Iancu
*Director of the United States Patent and Trademark Office*